(12) United States Patent
Shi

(10) Patent No.: US 8,937,695 B2
(45) Date of Patent: Jan. 20, 2015

(54) BACKPLANE AND LIQUID CRYSTAL MODULE HAVING SAME

(75) Inventor: Qinjun Shi, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 125 days.

(21) Appl. No.: 13/518,869

(22) PCT Filed: May 18, 2012

(86) PCT No.: PCT/CN2012/075696
§ 371 (c)(1),
(2), (4) Date: Jun. 22, 2012

(87) PCT Pub. No.: WO2013/166746
PCT Pub. Date: Nov. 14, 2013

(65) Prior Publication Data
US 2013/0300970 A1    Nov. 14, 2013

(30) Foreign Application Priority Data
May 9, 2012  (CN) .......................... 2012 1 0142202

(51) Int. Cl.
*G02F 1/1333* (2006.01)
*F16M 13/00* (2006.01)

(52) U.S. Cl.
USPC ............. 349/58; 248/560; 248/561; 248/563; 248/596; 248/613

(58) Field of Classification Search
None
See application file for complete search history.

(56) References Cited

U.S. PATENT DOCUMENTS

| 464,053 | A | * | 12/1891 | Wirths | 40/792 |
| 577,660 | A | * | 2/1897 | Liebmann | 40/748 |
| 7,316,379 | B1 | * | 1/2008 | Graham | 248/298.1 |
| 2010/0066937 | A1 | * | 3/2010 | Yamashita et al. | 349/58 |

FOREIGN PATENT DOCUMENTS

| CN | 2842665 Y | 11/2006 |
| CN | 201667176 U | 12/2010 |

* cited by examiner

*Primary Examiner* — Bumsuk Won
*Assistant Examiner* — Angela Davison
(74) *Attorney, Agent, or Firm* — Cheng-Ju Chiang

(57) ABSTRACT

The present invention provides a backplane and a liquid crystal module having the backplane. The backplane includes a main body, a plurality of raised ribs formed on the main body, and a plurality of wall mounting members rotatably attached to the raised ribs. Each of the wall mounting members is selectively set, through rotation, at a retracted position or a wall-mountable position with respect to the corresponding raised rib. The wall mounting members provided on the backplane of the liquid crystal module are made in a foldable arrangement, whereby in packaging, the wall mounting members are rotated to a retracted position located inside the backplane and in an operation of assembling a complete device, the wall mounting members are expanded to a wall-mountable position for use.

7 Claims, 5 Drawing Sheets

BACKPLANE AND LIQUID CRYSTAL MODULE HAVING SAME

BACKGROUND OF THE INVENTION

1. Field of the Invention

The present invention relates to the field of a liquid crystal module, and in particular to a backplane and a liquid crystal module having the backplane.

2. The Related Arts

In the field of manufacture of liquid crystal module, the manufacture of the liquid crystal module comprises an assembling process, in which components including a liquid crystal panel, a master control circuit, and an enclosure are assembled. Each of these components is mass-produced and stored in advance in order to be assembled in a subsequent operation to form a liquid crystal module. After the mass production, the liquid crystal module is stored in a packaging box in which spaced buffering grooves are formed for shipping and preservation.

As shown in FIG. 1, a backplane 1 of a conventional liquid crystal module is provided with raised wall mounting structures 2. These raised mounting structures 2 are projecting pegs. To prevent collision of the raised wall mounting structures 2 with the glass panel of an adjacent liquid crystal module, which might least to damage of the glass panel, during a packaging process, a sufficient space must be left between two liquid crystal modules. This makes a great amount of empty space left in a packaging box 3 and the utilization efficiency is low. Further, the number of liquid crystal modules deposited in a box is greatly limited and this is disadvantageous to the reduction of shipping costs.

SUMMARY OF THE INVENTION

An object of the present invention is to provide a backplane, which has a simplified structure, reduced thickness, and high packaging rate.

Another object of the present invention is to provide a liquid crystal module, which reduces overall thickness in packaging so as to the amount of space for packaging a liquid crystal module and packaging material used thereby improving packaging rate and reducing shipping cost of the liquid crystal module.

To achieve the objects, the present invention provides a backplane, which comprises: a main body, a plurality of raised ribs formed on the main body, and a plurality of wall mounting members rotatably attached to the raised ribs. Each of the wall mounting members is selectively set, through rotation, at a retracted position or a wall-mountable position with respect to the corresponding raised rib.

Each of the raised ribs forms a plurality of receiving slots and each of the receiving slots comprises a mounting section and a receiving section communicating with the mounting section. The mounting section has two opposite edges from which a pair of mounting tabs respectively extends. Each of the wall mounting members is rotatably mounted to each of the mounting sections in such a way that when the wall mounting member is in the retracted position, the wall mounting member is received in the receiving section and when the wall mounting member is in the wall-mountable position, the wall mounting member projects outward in the direction in which the raised rib is raised.

Each of the mounting tabs forms a mounting hole and each of the wall mounting members is of a U-shape having two limbs each having an outward-facing surface forming a pivot pin at a location close to a free end thereof. The pivot pins are respectively receivable in the mounting holes so as to rotatably attach the wall mounting member to the mounting tabs.

The wall mounting member is made of a spring plate and the mounting tabs extend in a direction that is opposite to the direction in which the raised rib is raised, the two paired mounting tabs being spaced by a distance that is greater than width of the corresponding receiving section measured in a direction along the distance.

The raised ribs have a number of two and each of the raised ribs forms two receiving slots.

Each of the wall mounting members has a central section in which a through hole is formed.

The present invention also provides a liquid crystal module, which comprises: a backplane, a backlight module arranged inside the backplane, and a liquid crystal panel arranged above the backlight module. The backplane comprises: a main body, a plurality of raised ribs formed on the main body, and a plurality of wall mounting members rotatably attached to the raised ribs. Each of the wall mounting members is selectively set, through rotation, at a retracted position or a wall-mountable position with respect to the corresponding raised rib.

Each of the raised ribs forms a plurality of receiving slots and each of the receiving slots comprises a mounting section and a receiving section communicating with the mounting section. The mounting section has two opposite edges from which a pair of mounting tabs respectively extends. Each of the wall mounting members is rotatably mounted to each of the mounting sections in such a way that when the wall mounting member is in the retracted position, the wall mounting member is received in the receiving section and when the wall mounting member is in the wall-mountable position, the wall mounting member projects outward in the direction in which the raised rib is raised.

Each of the mounting tabs forms a mounting hole and each of the wall mounting members is of a U-shape having two limbs each having an outward-facing surface forming a pivot pin at a location close to a free end thereof. The pivot pins are respectively receivable in the mounting holes so as to rotatably attach the wall mounting member to the mounting tabs. The wall mounting member is made of a spring plate and the mounting tabs extend in a direction that is opposite to the direction in which the raised rib is raised. The two paired mounting tabs are spaced by a distance that is greater than width of the corresponding receiving section measured in a direction along the distance. Each of the wall mounting members has a central section in which a through hole is formed.

The raised ribs have a number of two and each of the raised ribs forms two receiving slots.

The efficacy of the present invention is that the wall mounting members provided on the backplane of the liquid crystal module are made in a foldable arrangement, whereby in packaging, the wall mounting members are rotated to a retracted position located inside the backplane and in an operation of assembling a complete device, the wall mounting members are expanded to a wall-mountable position for use so that the overall packaging thickness of a liquid crystal module is reduced, the amount of space required for packaging the liquid crystal module and the packaging material used are both saved, the packaging rate is improved, and the shipping cost of the liquid crystal module is reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
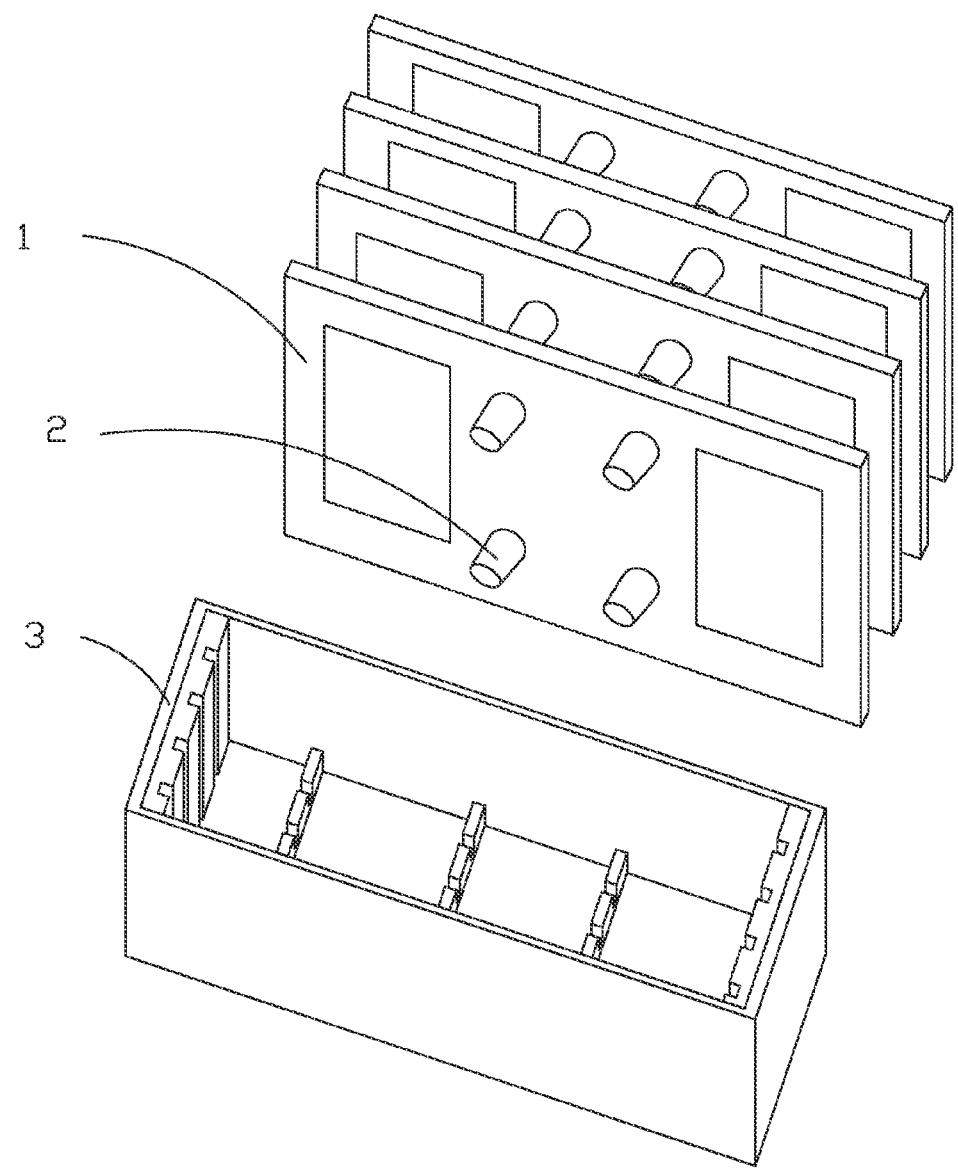
FIG. 1 is a schematic view illustrating packaging of conventional liquid crystal modules in a box.
Figure 2:
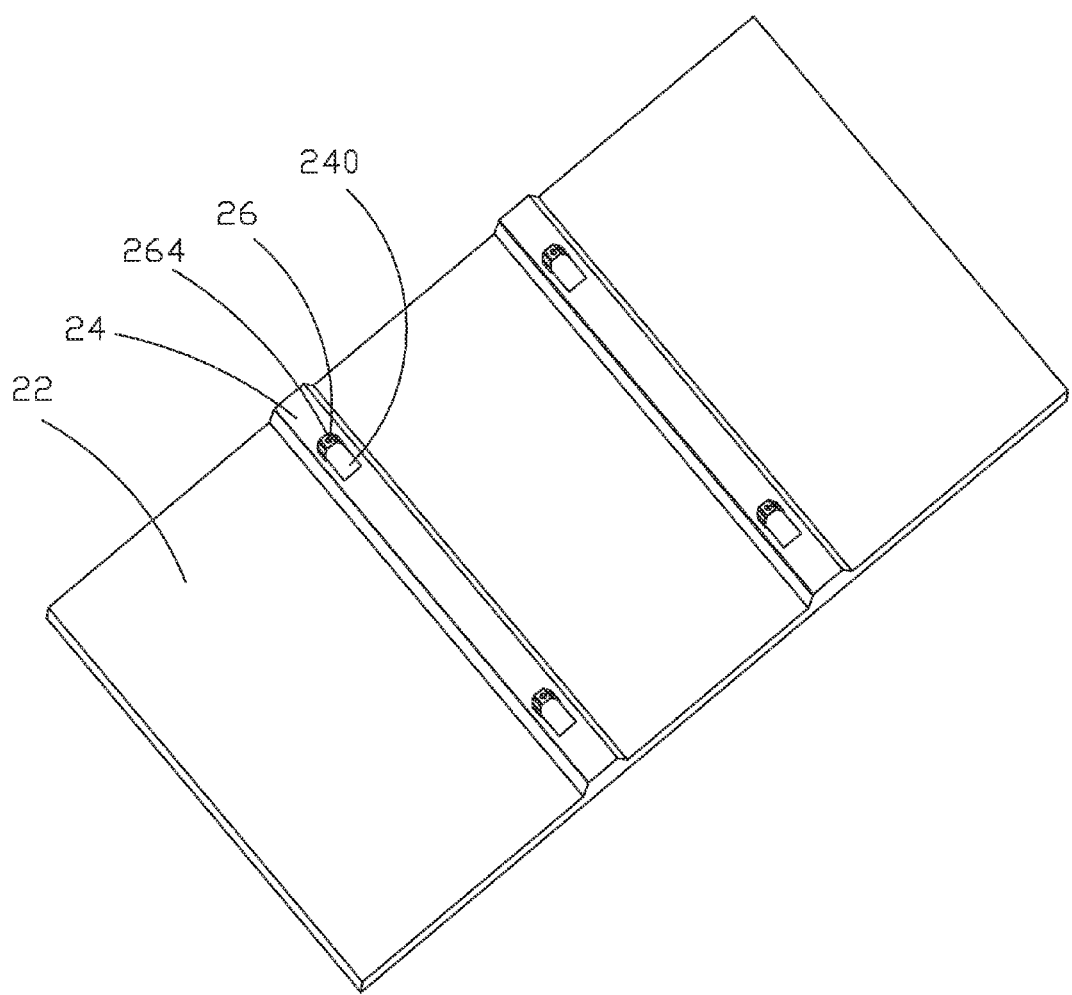
FIG. 2 is a perspective view showing a backplane according to the present invention.
Figure 3:
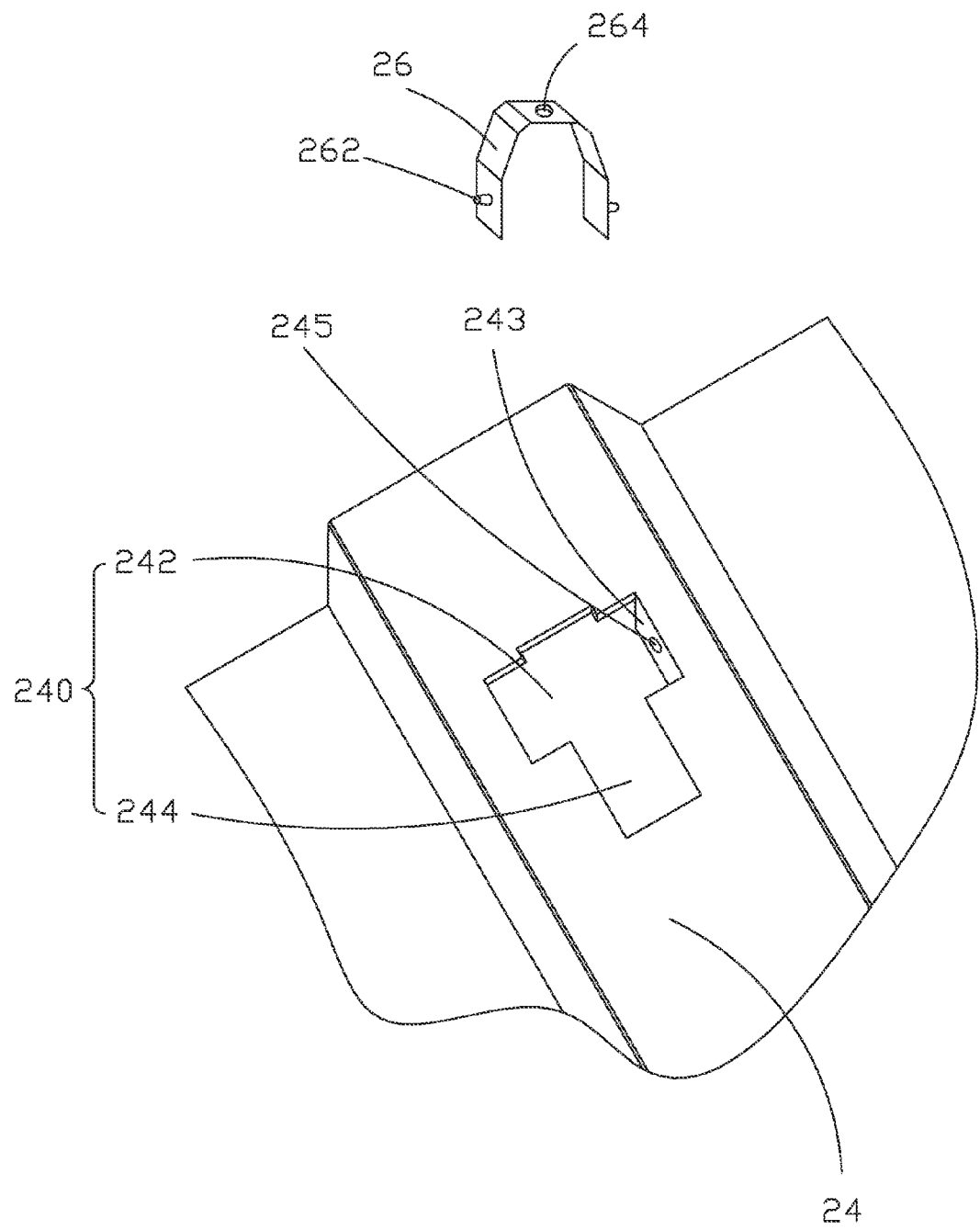
FIG. 3 is an exploded view showing a wall mounting member detached from a backplane body shown in FIG. 2.
Figure 4:
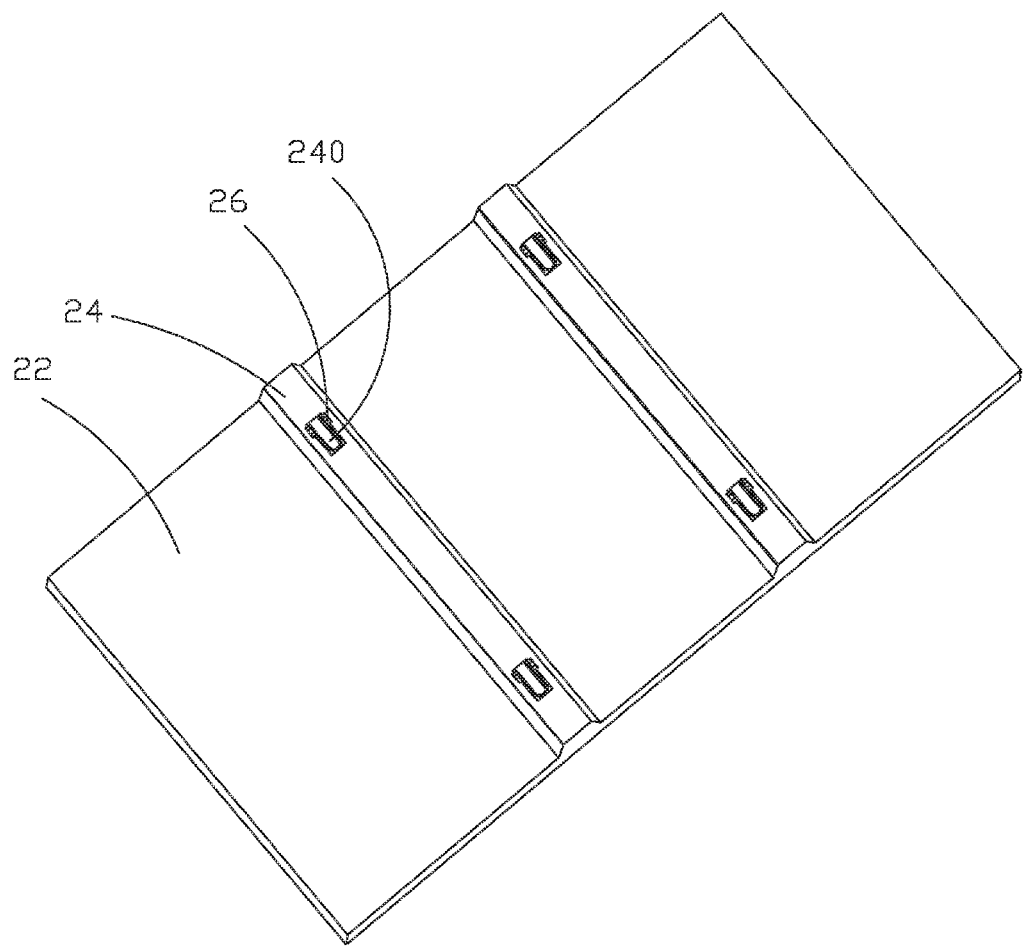
FIG. 4 is a perspective view showing the wall mounting member of the present invention retracted into a backplane body.

Referring to FIGS. 2-4, the present invention provides a backplane 2, which comprises: a main body 22, a plurality of raised ribs 24 formed on the main body 22, and a plurality of wall mounting members 26 rotatably attached to the raised ribs 24. Each wall mounting member 26 is selectively set, through rotation, at a retracted position or a wall-mountable position with respect to the corresponding raised rib 24.

Each of the raised ribs 24 forms a plurality of receiving slots 240, and each of the receiving slots 240 comprises a mounting section 242 and a receiving section 244 communicating with the mounting section 242. The mounting section 242 has two opposite edges from which a pair of mounting tabs 243 respectively extends. The wall mounting member 26 is rotatably mounted to the mounting section 242 in such a way that when the wall mounting member 26 is in the retracted position, the wall mounting member 26 is received in the receiving section 244 thereby reducing the overall thickness of the backplane 2 and when the wall mounting member 26 is in the wall-mountable position, the wall mounting member 26 projects outward in the direction in which the raised rib 24 is raised thereby allowing of a mounting operation of the backplane 2.

Each of the mounting tabs 243 forms a mounting hole 245. The wall mounting member 26 is of a U-shape having two limbs each having an outward-facing surface forming a pivot pin 262 at a location close to a free end thereof. The pivot pins 262 are respectively receivable in the mounting holes 245 so as to rotatably attach the wall mounting member 26 to the mounting tabs 243.

The wall mounting member 26 is made of a spring plate. The mounting tabs 243 extend in a direction that is opposite to the direction in which the raised rib 24 is raised. The two paired mounting tabs 243 are spaced by a distance that is greater than the width of the corresponding receiving section 244 measured in a direction along the distance.

In the instant embodiment, the raised ribs 24 used is of a number of two and are integrally formed with the main body 22 of the backplane 2 so as to locate on opposite side portions of the back of the main body 22 of the backplane 2. Further, each of the raised ribs 24 forms two receiving slots 240, which respectively correspond to two ends of the raised rib 24. The arrangement of the raised ribs 24 allows the wall mounting members 26 to be selectively received inside the receiving slots 240 of the raised ribs 24. Since the raised ribs 24 have a thickness that is smaller than the height of the wall mounting members 26, the packaging thickness required form the backplane 2 can be greatly reduced.

Each of the wall mounting members 26 has a central section in which a through hole 264 is formed for attaching the wall mounting member 26 to a fixture such as a wall (not shown).

Figure 5:
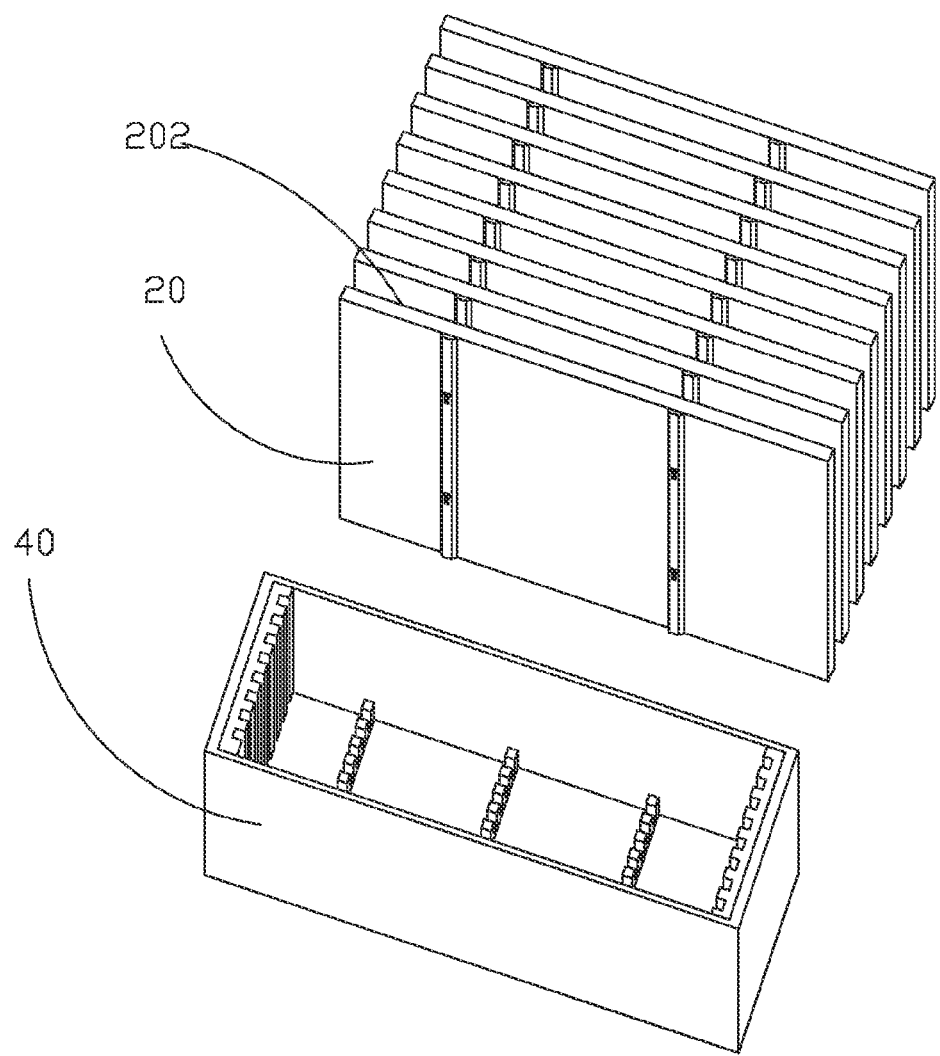
FIG. 5 is a schematic view illustrating packaging of liquid crystal modules according to the present invention.

Referring to FIG. 5, as well as FIGS. 2 and 3, the present invention also provides a liquid crystal module 20, which comprises: a backplane 2, a backlight module (not shown) arranged inside the backplane 2, and a liquid crystal panel 202 arranged above the backlight module. The backplane 2 comprises: a main body 22, a plurality of raised ribs 24 formed on the main body 22, and a plurality of wall mounting members 26 rotatably attached to the raised ribs 24. Each wall mounting member 26 is selectively set, through rotation, at a retracted position or a wall-mountable position with respect to the corresponding raised rib 24.

Each of the raised ribs 24 forms a plurality of receiving slots 240, and each of the receiving slots 240 comprise a mounting section 242 and a receiving section 244 communicating the mounting section 242. The mounting section 242 has two opposite edges from which two mounting tabs 243 respectively extend. The wall mounting member 26 is rotatably mounted to the mounting section 242 in such a way that when the wall mounting members 26 is in the retracted position, the wall mounting member 26 is received in the receiving section 244 thereby reducing the overall thickness of the liquid crystal module 20 and when the wall mounting member 26 is in the wall-mountable position, the wall mounting member 26 projects outward in the direction in which the raised ribs 24 is raised thereby allowing of a mounting operation of the liquid crystal module 20.

Each of the mounting tabs 243 forms a mounting hole 245. The wall mounting member 26 is of a U-shape having two limbs each having an outward-facing surface forming a pivot pin 262 at a location close to a free end thereof. The pivot pins 262 are respectively receivable in the mounting holes 245 so as to rotatably attach the wall mounting member 26 to the mounting tabs 243.

The wall mounting member 26 is made of a spring plate. The mounting tabs 243 extend in a direction that is opposite to the direction in which the raised rib 24 is raised. The two paired mounting tabs 243 are spaced by a distance that is greater than the width of the corresponding receiving section 244 measured in a direction along the distance.

In the instant embodiment, the raised ribs 24 used in of a number of two and are integrally formed with the main body 22 of the backplane 2 so as to locate on opposite side portions of the back of the main body 22 of the backplane 2. Further, each of the raised ribs 24 forms two receiving slots 240, which respectively correspond to two ends of the raised rib 24. The arrangement of the raised ribs 24 allows the wall mounting members 26 to be selectively received inside the receiving slots 240 of the raised ribs 24. Since the raised ribs 24 have a thickness that is smaller than the height of the wall mounting members 26, the packaging thickness required form the backplane 2 can be reduced, whereby the trouble that the raised height of the wall mounting structures of the conventional liquid crystal module affects packaging operation can overcome and the buffering grooves of a packaging box 40 is not subjected to constraint imposed by the height of the wall mounting members 26, so that the amount of space required for packaging and the packaging material used can both be saved, the packaging rate is improved, and the shipping cost of the liquid crystal module is reduced.

Each of the wall mounting members 26 has a central section in which a through hole 264 is formed for attaching the wall mounting member 26 to a fixture such as a wall (not shown).

In summary, the present invention provides a backplane and a liquid crystal module having the backplane, in which wall mounting members provided on the backplane of the liquid crystal module are made in a foldable arrangement, whereby in packaging, the wall mounting members are rotated to a retracted position located inside the backplane and in an operation of assembling a complete device, the wall mounting members are expanded to a wall-mountable position for use so that the overall packaging thickness of a liquid crystal module is reduced, the amount of space required for packaging the liquid crystal module and the packaging material used are both saved, the packaging rate is improved, and the shipping cost of the liquid crystal module is reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backplane, comprising: a main body, a plurality of raised ribs formed on the main body, and a plurality of wall mounting members rotatably attached to the raised ribs, each of the wall mounting members being selectively set, through rotation, at a retracted position or a wall-mountable position with respect to the corresponding raised rib;

wherein each of the raised ribs forms a plurality of receiving slots and each of the receiving slots comprises a mounting section and a receiving section communicating with the mounting section, the mounting section having two opposite edges from which a pair of mounting tabs respectively extends in a direction opposite to a direction in which the raised rib is raised, each of the wall mounting members being rotatably mounted to each of the mounting sections in such a way that when the wall mounting member is in the retracted position, the wall mounting member is completely received in the receiving section and when the wall mounting member is in the wall-mountable position, the wall mounting member projects outward in the direction in which the raised rib is raised; and wherein each of the mounting tabs forms a mounting hole and each of the wall mounting members is of a U-shape having two limbs each having an outward-facing surface forming a pivot pin at a location close to a free end thereof, the pivot pins being respectively receivable in the mounting holes so as to rotatably attach the wall mounting member to the mounting tabs.

2. The backplane as claimed in claim 1, wherein the wall mounting member is made of a spring plate and the mounting tabs extend in a direction that is opposite to the direction in which the raised rib is raised, the two paired mounting tabs being spaced by a distance that is greater than a width of the corresponding receiving section measured in a direction along the distance.

3. The backplane as claimed in claim 1, wherein the raised ribs have a number of two and each of the raised ribs forms two receiving slots.

4. The backplane as claimed in claim 1, wherein each of the wall mounting members has a central section in which a through hole is formed.

5. A backplane, comprising: a main body, a plurality of raised ribs formed on the main body, and a plurality of wall mounting members rotatably attached to the raised ribs, each of the wall mounting members being selectively set, through rotation, at a retracted position or a wall-mountable position with respect to the corresponding raised rib;

wherein each of the raised ribs forms a plurality of receiving slots and each of the receiving slots comprises a mounting section and a receiving section communicating with the mounting section, the mounting section having two opposite edges from which a pair of mounting tabs respectively extends in a direction opposite to a direction in which the raised rib is raised, each of the wall mounting members being rotatably mounted to each of the mounting sections in such a way that when the wall mounting member is in the retracted position, the wall mounting member is completely received in the receiving section and when the wall mounting member is in the wall-mountable position, the wall mounting member projects outward in the direction in which the raised rib is raised;

wherein each of the mounting tabs forms a mounting hole and each of the wall mounting members is of a U-shape having two limbs each having an outward-facing surface forming a pivot pin at a location close to a free end thereof, the pivot pins being respectively receivable in the mounting holes so as to rotatably attach the wall mounting member to the mounting tabs;

wherein the wall mounting member is made of a spring plate and the mounting tabs extend in a direction that is opposite to the direction in which the raised rib is raised, the two paired mounting tabs being spaced by a distance that is greater than a width of the corresponding receiving section measured in a direction along the distance;

wherein the raised ribs have a number of two and each of the raised ribs forms two receiving slots; and wherein each of the wall mounting members has a central section in which a through hole is formed.

6. A liquid crystal module, comprising: a backplane, a backlight module arranged inside the backplane, and a liquid crystal panel arranged above the backlight module, the backplane comprising: a main body, a plurality of raised ribs formed on the main body, and a plurality of wall mounting members rotatably attached to the raised ribs, each of the wall mounting members being selectively set, through rotation, at a retracted position or a wall-mountable position with respect to the corresponding raised rib;

wherein each of the raised ribs forms a plurality of receiving slots and each of the receiving slots comprises a mounting section and a receiving section communicating with the mounting section, the mounting section having two opposite edges from which a pair of mounting tabs respectively extends in a direction opposite to a direction in which the raised rib is raised, each of the wall mounting members being rotatably mounted to each of the mounting sections in such a way that when the wall mounting member is in the retracted position, the wall mounting member is completely received in the receiving section and when the wall mounting member is in the wall-mountable position, the wall mounting member projects outward in the direction in which the raised rib is raised; and wherein each of the mounting tabs forms a mounting hole and each of the wall mounting members is of a U-shape having two limbs each having an outward-facing surface forming a pivot pin at a location close to a free end thereof, the pivot pins being respectively receivable in the mounting holes so as to rotatably attach the wall mounting member to the mounting tabs; the wall mounting member is made of a spring plate and the mounting tabs extend in a direction that is opposite to the direction in which the raised rib is raised, the two paired mounting tabs being spaced by a distance that is greater than width of the corresponding receiving section measured in a direction along the distance; and each of the wall mounting members has a central section in which a through hole is formed.

7. The liquid crystal module as claimed in claim 6, wherein the raised ribs have a number of two and each of the raised ribs forms two receiving slots.

\* \* \* \* \*